United States Patent [19]

Jones

[11] 4,000,655
[45] Jan. 4, 1977

[54] MEASURING DEVICES FOR BORES AND DUCTS

[75] Inventor: Trevor Clifford Jones, Stroud, England

[73] Assignee: Underground Location Services Limited, England

[22] Filed: May 7, 1975

[21] Appl. No.: 575,223

[30] Foreign Application Priority Data

May 8, 1974 United Kingdom ............ 20303/74

[52] U.S. Cl. .............................. 73/432 R; 73/37.9; 73/40.5 R
[51] Int. Cl.² ...................... G01B 5/00; G01M 3/02
[58] Field of Search ............ 73/40.5 R, 37.9, 49.1, 73/389, 432 R; 138/90, 93; 33/DIG. 2, 343

[56] References Cited
UNITED STATES PATENTS

| | | | |
|---|---|---|---|
| 2,192,155 | 2/1940 | Schuldt | 73/40.5 R X |
| 2,428,326 | 9/1947 | Fay | 73/40.5 R X |
| 3,132,506 | 5/1964 | Pritchett | 73/40.5 R |
| 3,782,171 | 1/1974 | Watt | 73/37.9 |
| 3,817,086 | 6/1974 | Dorgebray | 73/40.5 R |

*Primary Examiner*—Richard C. Queisser
*Assistant Examiner*—John S. Appleman
*Attorney, Agent, or Firm*—Andrus, Sceales, Starke & Sawall

[57] ABSTRACT

A pipeline pig for locating constrictions or irregularities on the inner surface of a pipeline consists of a fluid-filled envelope, such as a rubber or rubberlike spherical or toroidal ball, arranged to be a close fit within the pipeline, and means for sensing pressure variations within the envelope. The distance travelled along the pipeline by the pig may be measured by means of a contact wheel running on the pipeline surface and provided with a revolution counter.

9 Claims, 4 Drawing Figures

MEASURING DEVICES FOR BORES AND DUCTS

FIELD OF THE INVENTION

This invention relates to measuring devices for bores and ducts and particularly to devices known as pigs which are passed through runs of pipeline for gauging, surveying or checking the duct provided by the pipeline.

SUMMARY OF THE PRESENT INVENTION

When large pipelines are commissioned it is common practice to check duct uniformity and to ascertain the existence and location of any constrictions, anomalies or irregularities by passing a pig through the pipeline. The pig may be simply a gauging pig in the form of a gauge plate smaller or perhaps 5% than the nominal pipe diameter or it may be one which travels unobstructedly through the pipe and records the presence and/or location of anomalies such as dents or projecting seams in its passage. The present invention is concerned with pigs of the latter kind and more generally with probe devices incorporating sensors for indicating the presence and/or location of duct irregularities during passage through a duct.

According to the invention, a measuring device for a bore or duct of predetermined nominal size comprises a fluid-filled envelope with a flexible wall arranged to be a close fit within a bore or duct of said nominal size and means for sensing pressure variations within the envelope.

The envelope may be a generally spherical rubber or rubber-like ball and may have a housing attached to it for a recorder and associated electronic circuits. The device may include one or more flexible cups attached to the envelope for propulsion in plunger fashion through a run of pipeline and in the preferred arrangement the housing is disposed between a ball envelope and a rear rearwardly-facing cup.

The means for measuring pressure variations preferably comprises one or a pair of pressure transducers projecting into the envelope and similar transducers responsive to ambient pressure with interconnection to provide a voltage or current proportional to the pressure difference. The voltage or current is monitored and preferably arranged to operate trip circuitry when the pressure difference exceeds a predetermined threshold value, as occurs, for example, when the pig encounters a dent in the pipe wall. The circuitry can be so arranged that only rapid pressure variations produce a response.

Provision for distance measurement may be made for the purpose of locating a detected anomaly. For such measurement, known methods may be adopted. In the case of welded pipelines, deformations are provided by the welded joints which are spaced at fairly regular intervals, and hence, without the addition of further measuring equipment, markings of a periodic nature appear on the recorder in the pig sufficient to indicate distance and to locate relatively large duct irregularities. The recordings do however sometimes lead to confusion, and tend to require skilled interpretation.

Improved arrangements for distance measurement are therefore preferably provided to develop pulses marking distance intervals for utilisation in the device.

Thus, in another aspect, the invention provides a measuring device for a bore or duct wherein the device is adapted to be passed through the bore or duct with parts engaging the inner face thereof for detecting irregularities in the bore or duct, distance travelled by the device being measured by generating and counting pulses of recurrence rate determined by a sensor of relative movement or of speed of movement.

The sensor may be a contact wheel which rides along the inner face of the bore or duct and carries a magnet, a cam device or a light reflector which provides a distinct signal per revolution.

BRIEF DESCRIPTION OF THE DRAWING

Two embodiments of the invention will now be described by way of example, with reference to the accompanying drawings in which.

DESCRIPTION OF THE PREFERRED EMBODIMENTS

Figure 1:
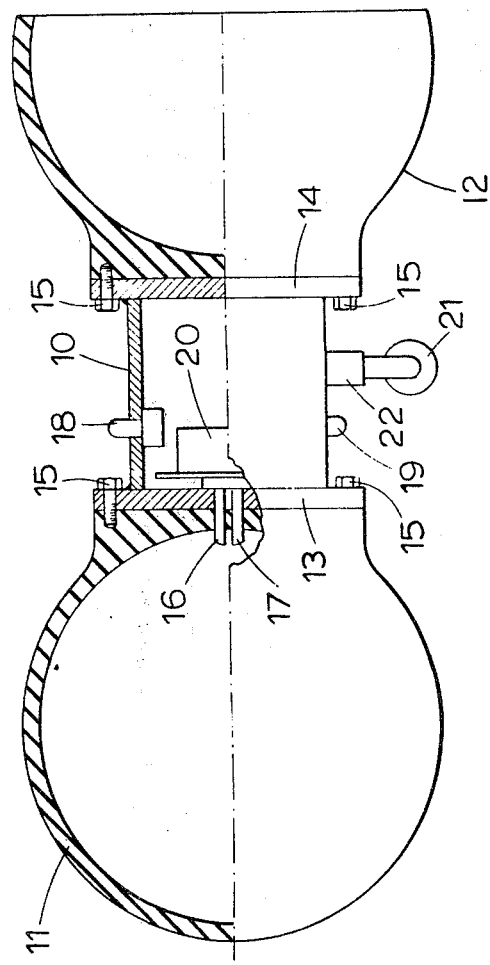
FIG. 1 is a part side elevational, part cross-sectional view of a pig in accordance with the invention.

Referring to FIG. 1, a data logging pipeline pig comprises a cylindrical body 10 having a hollow airfilled rubber ball 11 on one end, the diameter of the ball is marginally less than the internal diameter of the pipeline in which the pig is to be used.

For driving the pig by fluid pressure through a run of pipeline, a rubber cup 12 is mounted on to the opposite end of the cylindrical housing 10 so that the entire pig constitutes a piston in the pipeline, with the ball 11 and cup 12 having a fixed attitude in the pipeline and a common axis approximately coincident with the pipeline axis. For convenience in assembly, the ball 11 and cup 12 are each formed with a moulded flat face to which a respective end plate 13, 14 of the housing 10 may be bolted by screws 15 extending through radial flangelike portions.

For sensing pressure variations inside the ball 11 a pair of pressure transducers 16 and 17 are mounted on the end plate 13 to project therethrough and into the ball 11. For sensing the ambient or static head pressure, a second pair of pressure transducers 18 and 19 are mounted in the cylindrical wall of the housing 10 so as to project outwardly. The pressure difference between the two pairs of transducers is monitored and operates trip circuitry in a unit 20 located in the housing when this difference exceeds a predetermined value as will be described below. Such differences occur when, for example, the pig encounters a dent in the wall of the pipe.

In order to measure the distance which the pig travels along a pipeline, a wheel 21 is attached to the housing 10 by means of a spring loaded mounting 22 so that the wheel 21 rides along the inside of the pipe wall. The wheel 21 incorporates a magnet, a cam device or a light reflector so as to give a distinct signal once per revolution of the wheel.

Figure 3:
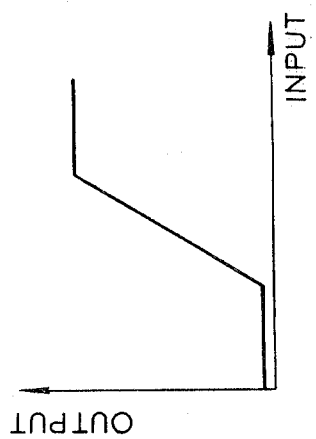
FIG. 3 is a graph illustrating the transfer characteristics of an amplifier forming part of the apparatus shown in FIG. 2.
Figure 2:
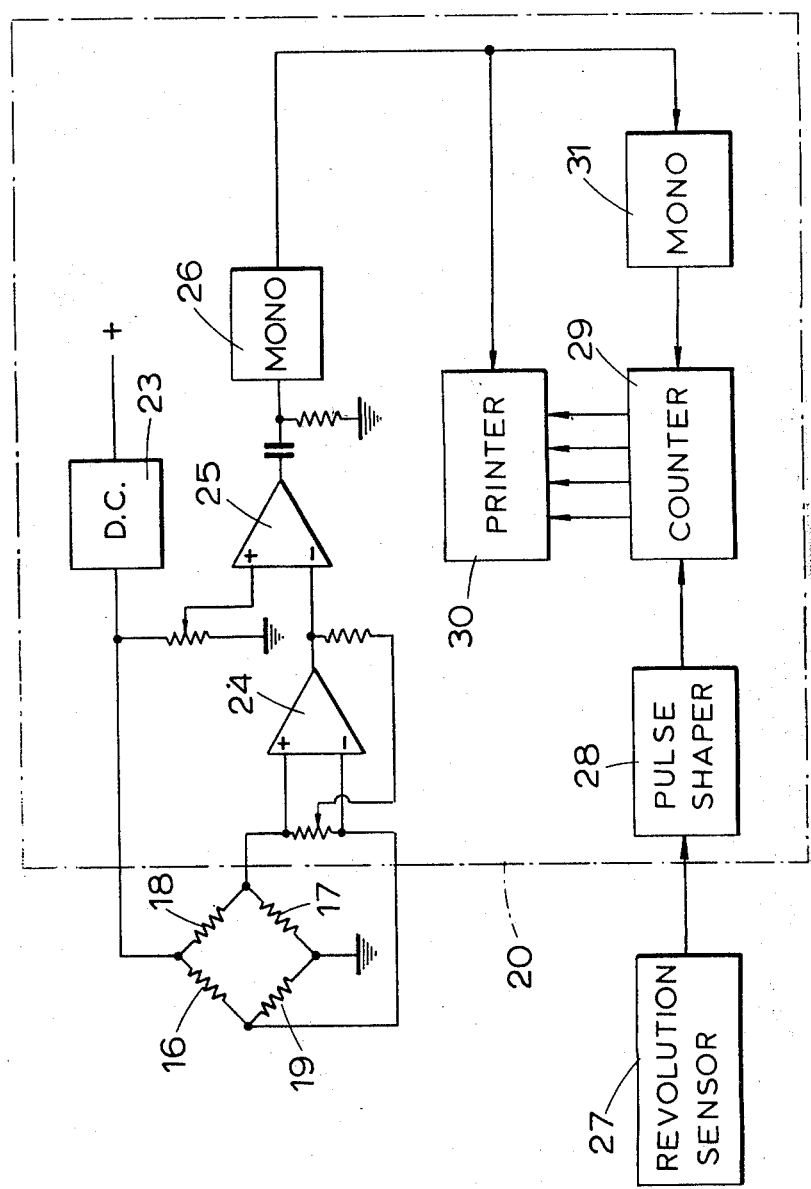
FIG. 2 is a block diagram of the sensing and recording apparatus for the pig shown in FIG. 1.

Referring to FIG. 2, the pressure transducers 16, 17, 18 and 19 are connected in pairs to form the four arms of a balanced bridge with the transducers 16 and 17 in diagonally opposite arms. The bridge is fed from a battery (not shown) via a DC stabilising circuit 23. The output of the bridge is applied to a differential amplifier 24 having a sigmoid transfer characteristic as shown in FIG. 3, the output voltage remaining small until the input voltage reaches a predetermined value and then rising sharply to a substantially constant value for a range of larger input voltages. The output of the amplifier 24 is used to trigger a Schmitt circuit 25 which provides the trigger input to a monostable multivibrator 26. The latter is designed to trigger only on fast rise-time edges of the input waveform. Slow variations due to poor tracking by the pig and non-linearity in the pressure transducers 16, 17, 18 and 19 do not therefore produce any output. A rapid pressure change, however, produces a narrow output pulse which is used to cause recordal of an irregularity as will be described below.

The mounting 22 for the wheel 21 (FIG. 1) includes a sensor 27 responsive to the magnet, cam device or light reflector of the wheel. The output of the sensor 27 is applied via a pulse shaper 28 to a counter 29. The counter 29 is arranged to count the pulses from the sensor 27 and produces an output to a printer 30 which may constitute the total number of pulses counted. Alternatively, the counter 29 may include an arithmetic unit arranged to convert the pulse count into more conventional distance units such as meters.

The output from the monostable multivibrator 26 is connected to a control input of the printer 30 so that, on occurrence of a rapid change in the pressure difference between the inside and the outside of the wall 11, the output of the counter 29 is recorded by the printer 30. In addition, the output of the monostable multivibrator 26 is connected via a second monostable multivibrator 31 to the reset input of the counter 29, the monostable multivibrator 31 providing sufficient delay to ensure that the printer 30 has completed its operation before the counter 29 is reset. Thus, the distances 25 recorded by the printer 30 constitute the distances between successive irregularities of the pipeline detected by the pig.

Instead of being connected to the printer 30, the output of the monostable multivibrator 26 may be connected to a continuously running event recorder (not shown) which may also receive strobe pulses from the pulse shaper 28.

In order to guard against the possibility that the wheel 21 may slip, it is preferable to provide two such wheels on opposite sides of the housing 10 so as to engage with opposite sides of the pipeline. In normal operation, a pulse from the sensor associated with one of the wheels will be followed by a pulse from the sensor associated with the other. However, if one of the wheels should slip, two successive pulses may be received from the other wheel. The outputs of the two sensors are connected to a logic circuit so arranged that, if two successive pulses are received from one sensor without an intervening pulse from the other, an additional pulse is added to the output to compensate for the missing pulse from the sensor associated with the slipping wheel.

The housing 10 constitutes a sealed enclosure to protect the electronic circuitry from the environment in the pipeline and has a sealed cover plate (not shown) to provide access for installation of equipment, replacement of batteries and removal of record charts.

Figure 4:
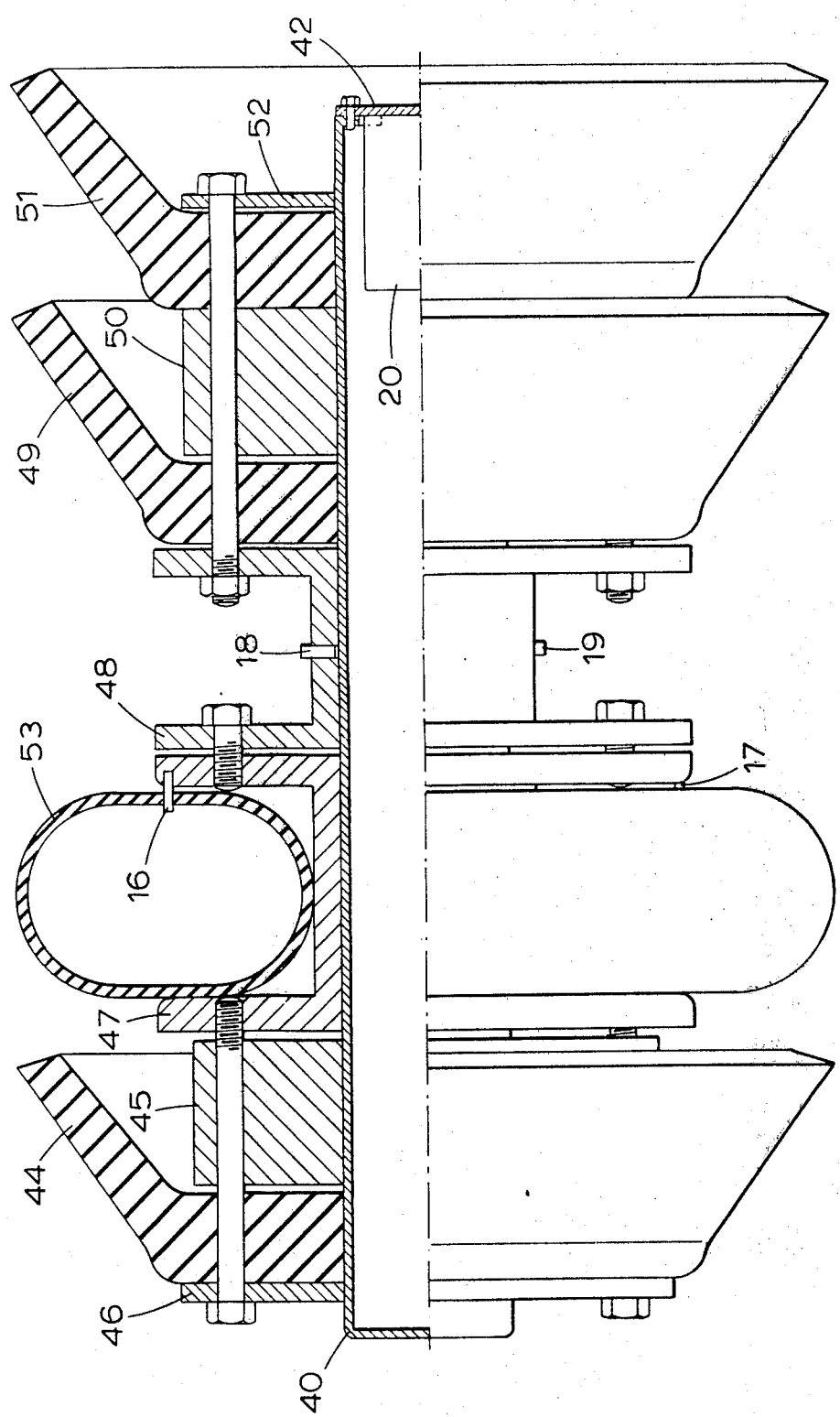
FIG. 4 is a part side elevational, part cross-sectional view of a pig in accordance with another embodiment of the invention.

FIG. 4 shows an alternative pig to that shown in FIG. 1 but which also employs the circuit shown in FIG. 2. The pig has a cylindrical body 40 providing a steel enclosure closed by a plate 42 at its rear end. The unit 20 housing the circuitry is mounted on the inner side of the plate 42.

Mounted on the cylindrical housing 40 are the following series of annular elements. At the front of the pig, a rubber cup 44 and a spacer 45 are clamped between an end plate 46 and a first annular channel member 47. The first annular channel member 47 is bolted to a second annular channel member 48. A second rubber cup 49, a spacer 50 and a third rubber cup 51 are clamped between an end plate 52 and the second annular channel member 48. Thus, as was described with reference to the pig illustrated in FIG. 1, the pig illustrated in FIG. 4 functions as a piston in the pipeline so that it may be propelled therethrough by fluid pressure.

The fluid-filled envelope with a flexible wall takes the form of a toroidal rubber tube 53 mounted in the first annular channel member 47. The transducers 16 and 17 for sensing the pressure inside the tube 53 are mounted on one end of the first annular channel member 47 and project into the tube 53. The other two transducers 18 and 19, for sensing ambient pressure outside the tube, are mounted in the second annular channel member 48.

The tube 53 is inflated to such an extent that its external diameter is slightly less than the external diameter of the cups 44, 49 and 51. Thus, in use, as the pig travels along a pipeline, the tube 53 is in contact with the pipe wall only when an irregularity is detected and is therefore not subject to abrasion when the pig is passing along the pipeline between irregularities.

What is claimed is:

1. A measuring device for detecting surface irregularities on the internal walls of an elongated duct which reduce the nominal internal cross-section of the duct by more than a predetermined amount, said duct containing a fluid flowable therethrough, said measuring device comprising:
   a sealed envelope containing fluid which is isolated from the fluid in the duct, said envelope having an external dimension less by said predetermined amount than the nominal internal cross-section of the duct and having a wall deformable upon contact with said irregularities for altering the fluid pressure within said envelope;
   means responsive to the flow of fluid through the duct for moving said envelope along the duct; and
   means for comparing the pressure of the fluid in the envelope with the pressure of the fluid in the duct for ascertaining pressure alterations within the envelope resulting from deformation of said flexible envelope wall by contact with the irregularities as an envelope is moved along the duct.

2. A measuring device as claimed in claim 1, in which the means for sensing pressure variations within the envelope comprises a first transducer located in the envelope and a second transducer located outside the envelope connected in adjacent arms of a bridge circuit and a threshold detector responsive to the bridge circuit for determining when the difference between the pressures at said first and second transducers exceeds a predetermined value.

3. A measuring device as claimed in claim 2, in which the means for sensing pressure variations comprises two first transducers disposed in said envelope and connected in opposite arms of said bridge circuit and two second transducers disposed outside said envelope and connected in opposite arms of said bridge circuit.

4. A measuring device as claimed in claim 1, including means for producing distance pulses marking distance intervals travelled by the measuring device, a counter for counting the distance pulses and means responsive to the threshold detector for recording the instantaneous value of the count in the counter.

5. A measuring device as claimed in claim 4, in which the counter is arranged to be reset following each recordal of the count therein.

6. A measuring device as claimed in claim 4, in which a means for producing distance pulses comprises a contact wheel arranged to engage with the inner surface of the bore or duct and means for producing said distance pulses in response to rotation of the contact wheel.

7. A measuring device as claimed in claim 1, in which the envelope comprises a spherical or spheroidal ball mounted on one end of the device.

8. A measuring device as claimed in claim 1, in which the envelope comprises a toroid mounted round an axially oriented body portion of said measuring device.

9. A measuring device as claimed in claim 1 wherein said means for moving said envelope comprises a rearwardly facing flexible cup so dimensioned with respect to the internal cross-section of the duct that the measuring device forms a piston in the duct.

* * * * *